United States Patent
Sawaki et al.

(10) Patent No.: US 10,731,015 B2
(45) Date of Patent: *Aug. 4, 2020

(54) MODIFIED FLUORINE-CONTAINING COPOLYMER, FLUORINE RESIN MOLDED ARTICLE, AND METHOD FOR MANUFACTURING FLUORINE RESIN MOLDED ARTICLE

(71) Applicant: DAIKIN INDUSTRIES, LTD., Osaka-shi, Osaka (JP)

(72) Inventors: Kyouhei Sawaki, Settsu (JP); Hideki Kono, Settsu (JP); Hitoshi Imamura, Settsu (JP); Takahisa Aoyama, Settsu (JP); Masamichi Sukegawa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/412,525

(22) PCT Filed: Jul. 4, 2013

(86) PCT No.: PCT/JP2013/068418
§ 371 (c)(1),
(2) Date: Jan. 2, 2015

(87) PCT Pub. No.: WO2014/007346
PCT Pub. Date: Jan. 9, 2014

(65) Prior Publication Data
US 2015/0158988 A1    Jun. 11, 2015

(30) Foreign Application Priority Data
Jul. 5, 2012   (JP) ................. 2012-151826

(51) Int. Cl.
*C08J 7/00*   (2006.01)
*C08J 7/12*   (2006.01)
*B29C 35/08*  (2006.01)
*C08J 3/28*   (2006.01)
*B29K 27/12*  (2006.01)

(52) U.S. Cl.
CPC .............. *C08J 7/123* (2013.01); *B29C 35/08* (2013.01); *C08J 3/28* (2013.01); *B29K 2027/12* (2013.01); *C08J 2327/16* (2013.01); *C08J 2327/18* (2013.01)

(58) Field of Classification Search
CPC . C08J 7/123; C08J 3/28; C08J 2327/16; C08J 2327/18; B29C 35/08; B29C 2027/12
See application file for complete search history.

(56) References Cited

FOREIGN PATENT DOCUMENTS

| | | |
|---|---|---|
| JP | 11-49867 A | 2/1999 |
| JP | 11-349711 A | 12/1999 |
| JP | 2000-186162 A | 7/2000 |
| JP | 2002-30166 A | 1/2002 |
| JP | 2002-284893 A | 10/2002 |
| JP | 2002-327068 A | 11/2002 |
| JP | 2002-338766 A | 11/2002 |
| JP | 2003-165853 A | 6/2003 |
| JP | 2003-183412 A | 7/2003 |
| JP | 2004-10717 A | 1/2004 |
| JP | 2005-113116 A | 4/2005 |
| JP | 2007-137982 A | 6/2007 |
| JP | 2008-231330 A | 10/2008 |
| JP | 2008-231331 A | 10/2008 |
| JP | 2010-155443 A | 7/2010 |
| JP | 2011-105012 A | 6/2011 |
| JP | 2014-28952 A | 2/2014 |
| JP | 2014-28953 A | 2/2014 |
| WO | 2014/007348 A1 | 1/2014 |
| WO | 2014/007350 A1 | 1/2014 |

OTHER PUBLICATIONS

International Search Report for PCT/JP2013/068418 dated Sep. 17, 2013.
Machine Translation of JP 11-049867, which was submitted in the IDS filed on Jan. 2, 2015.
Machine Translation of JP 2000-186162, which was submitted in the IDS filed on Jan. 2, 2015.
Machine Translation of JP 2002-284893, which was submitted in the IDS filed on Jan. 2, 2015.
Machine Translation of JP 2010-155443, which was submitted in the IDS filed on Jan. 2, 2015.
Machine Translation of JP 2007-137982, which was submitted in the IDS filed on Jan. 2, 2015.
International Preliminary Report on Patentability issued by the International Searching Authority in counterpart International application No. PCT/JP2013/068420, dated Jan. 6, 2015.
International Preliminary Report on Patentability issued by the International Searching Authority in counterpart International application No. PCT/JP2013/068418, dated Jan. 6, 2015.
International Preliminary Report on Patentability issued by the International Searching Authority in counterpart International application No. PCT/JP2013/068424, dated Jan. 6, 2015.

*Primary Examiner* — Jessica M Roswell
(74) *Attorney, Agent, or Firm* — Sughrue Mion, PLLC

(57) ABSTRACT

The present invention aims to provide a modified fluorine-containing copolymer excellent in crack resistance, a fluororesin molded article, and a method of producing a fluororesin molded article. The present invention includes a modified fluorine-containing copolymer consisting only of tetrafluoroethylene units and perfluoro(alkyl vinyl ether) units. The copolymer is modified by irradiation with radiation at an irradiation temperature not higher than the melting point of the copolymer but not lower than 200° C.

8 Claims, No Drawings

MODIFIED FLUORINE-CONTAINING COPOLYMER, FLUORINE RESIN MOLDED ARTICLE, AND METHOD FOR MANUFACTURING FLUORINE RESIN MOLDED ARTICLE

CROSS REFERENCE TO RELATED APPLICATIONS

This application is a National Stage of International Application No. PCT/JP2013/068418 filed Jul. 4, 2013, claiming priority based on Japanese Patent Application No. 2012-151826, filed Jul. 5, 2012, the contents of all of which are incorporated herein by reference in their entirety.

TECHNICAL FIELD

The present invention relates to a modified fluorine-containing copolymer, a fluororesin molded article, and a method of producing a fluororesin molded article.

BACKGROUND ART

Fluorine-containing copolymers are excellent in such properties as heat resistance, chemical resistance, weather resistance, and stain resistance and used in various fields including semiconductor fields, automobile fields, architecture fields, electric and electronic fields, chemical plant fields, and medical fields.

Various ways have been studied for further improving properties of fluorine-containing copolymers such as heat resistance, mechanical characteristics, and radiation resistance.

One known way for modifying fluorine-containing copolymers is to irradiate them with radiation. Generally known examples of methods for such modification include methods in which fluorine-containing copolymers are heated to a temperature not lower than the melting point and irradiated with radiation (Patent Literatures 1 and 2).

However, when a molded article obtained by molding a fluorine-containing copolymer is heated to a temperature higher than the melting point and irradiated with radiation, the molded article disadvantageously lose its shape. The irradiation with radiation also promotes degradation of fluororesin, failing to sufficiently provide the desired mechanical characteristics.

Patent Literature 3 discloses a method of producing a modified fluororesin. The method includes crosslinking the resin, without preheating, by irradiating ionizing radiation in the designated exposure dose irradiating at a high dose rate of not lower than 100 kGy/sec with a dose of 200 kGy to 100 MGy of ionizing radiation produced from a particle accelerator, whereby achieves improvement in heat resistance and chemical resistance in a simple manner and in a short period of time.

Patent Literature 4 teaches that thermal degradation resistance and compression strain resistance of a fluororesin are improved by heating the fluororesin to a temperature within the range from 0 to 150° C. or from 0° C. to the crystal dispersion temperature, irradiating the heated fluororesin with a dose of 5 Gy to 500 kGy of ionizing radiation, and holding the irradiated fluororesin at a predetermined temperature for a predetermined time.

Patent Literatures 5 to 7 disclose irradiation of a tetrafluoroethylene-perfluoro(alkyl vinyl ether) copolymer or a composition containing the copolymer with a dose of 10 kGy or more of ionizing radiation at an irradiation condition of not higher than 100° C.

Patent Literature 8 discloses another method of producing a modified fluororesin molded article. The method includes applying a fluororesin to a metal substrate that does not bond well to the fluororesin, crosslinking the fluororesin by irradiating it with ionizing radiation at 200° C. to 400° C., and peeling or separating the fluororesin from the substrate.

Patent Literature 9 discloses a method of producing a composite material which includes a crosslinked fluororesin layer excellent in abrasion resistance and adhesion to the substrate. The method includes: forming a fluororesin layer on a substrate, firing the fluororesin layer by heating up to 150° C. higher than the melting point; adjusting the temperature of the fired uncrosslinked fluororesin layer to a temperature within the range from a temperature 60° C. lower than the melting point (Tm) of the fluororesin to a temperature 1° C. lower than the Tm; and crosslinking the fluororesin by irradiating it with radiation.

Patent Literature 10 discloses a material coated with a modified fluororesin. The material has a crosslinked fluororesin film on a substrate which is thermally stable at a temperature not lower than the melting point of the fluororesin to be crosslinked. Here, the crosslinked fluororesin film is obtained by crosslinking a fluororesin at a temperature within the range from 250° C. to 400° C. with ionizing radiation.

CITATION LIST

Patent Literature

Patent Literature 1: JP H11-49867 A
Patent Literature 2: JP 2000-186162 A
Patent Literature 3: JP H11-349711 A
Patent Literature 4: JP 2002-327068 A
Patent Literature 5: JP 2007-137982 A
Patent Literature 6: JP 2008-231330 A
Patent Literature 7: JP 2008-231331 A
Patent Literature 8: JP 2002-30166 A
Patent Literature 9: JP 2010-155443 A
Patent Literature 10: JP 2011-105012 A

SUMMARY OF INVENTION

Technical Problem

However, fluorine-containing copolymers obtained in these conventional modifying methods are still insufficient in crack resistance.

For producing small or complex-shaped molded articles of fluorine-containing copolymers, fluorine-containing copolymers having good moldability and good flowability are required. However, fluorine-containing copolymers which are excellent in flowability have a relatively small molecular weight, and therefore have poor crack resistance. Such small or complex-shaped molded articles are therefore typically produced by not extrusion molding or injection molding but compression molding of a high-molecular-weight material and then fabricating the molded material into the desired molded articles. Such a conventional method suffers from low production efficiency and high cost of the resulting products.

In view of the above situation in the art, the present invention aims to provide a modified fluorine-containing copolymer excellent in crack resistance, a fluororesin molded article excellent in crack resistance, and a method of producing a fluororesin molded article excellent in crack resistance.

Solution to Problem

As a result of studies on such requirements, the inventors have found that a modified fluorine-containing copolymer which is excellent in crack resistance can be obtained by irradiating a specific fluorine-containing copolymer with radiation at an irradiation temperature within a specific range. Such a finding has led to the completion of the present invention.

Accordingly, one aspect of the present invention is a modified fluorine-containing copolymer consisting only of tetrafluoroethylene units and perfluoro(alkyl vinyl ether) units. The copolymer is modified by irradiation with radiation at an irradiation temperature not higher than the melting point of the copolymer but not lower than 200° C.

Another aspect of the present invention is a fluororesin molded article comprising the modified fluorine-containing copolymer.

Yet another aspect of the present invention is a fluororesin molded article obtainable by a method of producing a molded article, the method including: molding a copolymer that consists only of tetrafluoroethylene units and perfluoro (alkyl vinyl ether) units; and irradiating the molded copolymer with radiation at an irradiation temperature not higher than the melting point of the copolymer but not lower than 200° C.

Preferably, the molding is performed by compression molding, injection molding, or extrusion molding.

Preferably, each of the fluororesin molded articles of the present invention is a sheet.

Preferably, the copolymer consisting only of tetrafluoroethylene units and perfluoro(alkyl vinyl ether) units contains the perfluoro(alkyl vinyl ether) units in an amount of 0.1 to 12% by mass based on all the monomer units.

Preferably, the copolymer consisting only of tetrafluoroethylene units and perfluoro(alkyl vinyl ether) units has a melting point of 280° C. to 322° C.

Preferably, the perfluoro(alkyl vinyl ether) is perfluoro (propyl vinyl ether).

Yet another aspect of the present invention is a method of producing a fluororesin molded article, the method including: molding a copolymer that consists only of tetrafluoroethylene units and perfluoro(alkyl vinyl ether) units; and irradiating the molded copolymer with radiation at an irradiation temperature not higher than the melting point of the copolymer but not lower than 200° C.

Preferably, in the method of the present invention, the molded copolymer is irradiated with a dose of 10 kGy to 250 kGy of radiation.

Advantageous Effects of Invention

According to the present invention, a modified fluorine-containing copolymer and a fluororesin molded article each excellent in crack resistance can be obtained.

DESCRIPTION OF EMBODIMENTS

The present invention is described in detail below.
One aspect of the present invention is a modified fluorine-containing copolymer consisting only of tetrafluoroethylene units and perfluoro(alkyl vinyl ether) units. The copolymer is modified by irradiation with radiation at an irradiation temperature not higher than the melting point of the copolymer but not lower than 200° C. The modified fluorine-containing copolymer is thus excellent in crack resistance.

The modified fluorine-containing copolymer of the present invention is obtainable by irradiating the copolymer that consists only of tetrafluoroethylene (TFE) units and perfluoro(alkyl vinyl ether) (PAVE) units (hereinafter, also referred to as a "TFE/PAVE copolymer") with radiation at an irradiation temperature in a specific range.

Examples of the PAVE constituting the TFE/PAVE copolymer include at least one selected from the group consisting of PAVE represented by Formula (1):

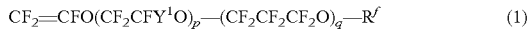

$$CF_2=CFO(CF_2CFY^1O)_p-(CF_2CF_2CF_2O)_q-R^f \qquad (1)$$

wherein $Y^1$ represents F or $CF_3$; $R^f$ represents a C1 to C5 perfluoroalkyl group; p represents an integer of 0 to 5; and q represents an integer of 0 to 5, and Formula (2):

$$CFX=CXOCF_2OR^1 \qquad (2)$$

wherein Xs are the same as or different from each other, each representing H, F, or $CF_3$; $R^1$ represents a C1 to C6 straight chain or branched fluoroalkyl group that may contain one or two atoms of at least one selected from the group consisting of H, Cl, Br, and I or a C1 to C5 or C6 cyclic fluoroalkyl group that may contain one or two atoms of at least one selected from the group consisting of H, Cl, Br, and I.

The PAVE preferably contains a bulky side chain. In particular, the PAVE is preferably perfluoro(propyl vinyl ether).

The TFE/PAVE copolymer preferably contains polymer units based on PAVE in an amount of 0.1 to 12% by mass, more preferably 1.0 to 8.0% by mass, still more preferably 2.0 to 6.5% by mass, and particularly preferably 3.5 to 6.0% by mass based on all the polymer units.

The amount of the polymer units based on PAVE may be measured by $^{19}$F-NMR.

The TFE/PAVE copolymer preferably has a melting point of 280 to 322° C. The melting point is more preferably not lower than 285° C., and also more preferably not higher than 315° C.

The melting point herein is a temperature corresponding to a local maximum value on a heat of fusion curve that is determined by increasing the temperature of the copolymer at a rate of 10° C./min using a differential scanning calorimeter [DSC].

The TFE/PAVE copolymer preferably has a glass transition temperature (Tg) of 70° C. to 110° C.

The glass transition temperature is more preferably not lower than 80° C., and also more preferably not higher than 100° C.

The glass transition temperature herein is measured by dynamic viscoelasticity measurement.

The TFE/PAVE copolymer can be produced by a conventionally known method. For example, the copolymer can be produced by appropriately mixing monomers as the constitutional units with additives such as a polymerization initiator and performing emulsion polymerization, solution polymerization, suspension polymerization, or the like.

The TFE/PAVE copolymer preferably has a melt flow rate (MFR) of 1 to 50 g/10 min at 372° C. If the MFR is within this range, a remarkable crosslinking effect can be obtained.

The MFR is more preferably not lower than 10 g/10 min, and also more preferably not higher than 40 g/10 min. The MFR herein is determined in accordance with ASTM D1238. Specifically, it is determined as the mass of the polymer exiting from a nozzle (inner diameter: 2 mm, length: 8 mm) per 10 minutes measured with a melt indexer (from Yasuda Seiki seisakusho Ltd.) at 372° C. under a load of 5 kg.

In the present invention, the TFE/PAVE copolymer is irradiated with radiation at an irradiation temperature not higher than the melting point of the copolymer but not lower than 200° C. Therefore, even if the irradiation is performed after molding the TFE/PAVE copolymer into the desired shape, the molded article does not lose its shape.

The reason why the crack resistance of the TFE/PAVE copolymer is improved by such heating of the TFE/PAVE copolymer to a temperature in the above-described specific range and irradiation is presumably as follows. The TFE/PAVE copolymer contains a large amount of large side chains that comprise alkoxy groups, and molecular motion of these side chains is large even at lower temperatures. This allows the effects of the irradiation to be sufficiently produced even at low temperatures.

The irradiation temperature is not higher than the melting point of the TFE/PAVE copolymer but not lower than 200° C. When the irradiation temperature is not lower than 200° C., a fluorine-containing copolymer and a fluororesin molded article each excellent in crack resistance can be obtained. The irradiation temperature is more preferably not lower than 210° C., and still more preferably not lower than 230° C., and also preferably not higher than 300° C., more preferably not higher than 270° C., and still more preferably not higher than 265° C. If the irradiation temperature is within the above range, the copolymer has even better crack resistance.

The irradiation temperature is preferably more than 20° C. lower than the melting point of the TFE/PAVE copolymer, and more preferably 25° C. or more lower than the melting point.

The way of adjustment of the irradiation temperature is not particularly limited, and the temperature may be adjusted by a conventionally known method. Specifically, the irradiation temperature may be adjusted by, for example, holding the TFE/PAVE copolymer in a heating furnace maintained at a predetermined temperature. Alternatively, it may be adjusted by placing the copolymer on a hot plate and heating the hot plate by powering a heater built therein or by using an external heating means.

Examples of the radiation include electron beam, ultraviolet rays, gamma rays, X-rays, neutron rays, and high energy ions. Among these, electron beam is preferred in view of excellent penetrating power, high dose rates, and suitable for industrial production.

The way of irradiation with radiation is not particularly limited. For example, the irradiation may be performed with a conventionally known radiation irradiation device.

The irradiation dose is preferably 10 kGy to 250 kGy. If the irradiation dose is less than 10 kGy, production of radicals that are involved in crosslinking reaction may be insufficient, which may lead to insufficient crosslinking effect. If the irradiation dose is more than 250 kGy, the copolymer may be degraded to lower molecular weight products due to main-chain break, which may significantly reduce mechanical strength.

The irradiation dose is more preferably not less than 20 kGy, and still more preferably not less than 30 kGy, and also preferably not higher than 100 kGy, still more preferably not higher than 90 kGy, and particularly preferably not higher than 80 kGy.

The irradiation environment is not particularly limited. The irradiation is preferably performed at an oxgen concentration of not higher than 1000 ppm, more preferably in the absence of oxygen, and still more preferably in vacuum or in an inert gas atmosphere such as nitrogen, helium, or argon atmosphere.

Thus, the irradiation of the TFE/PAVE copolymer with radiation at an irradiation temperature within a specific range can provide a modified fluorine-containing copolymer having excellent crack resistance.

A fluororesin molded article produced from the modified fluorine-containing copolymer of the present invention is another aspect of the present invention.

The fluororesin molded article of the present invention is preferably produced by a method including: molding a copolymer (a TFE/PAVE copolymer) that consists only of TFE units and PAVE units; and irradiating the molded copolymer with radiation at an irradiation temperature not higher than the melting point of the copolymer but not lower than 200° C.

A fluororesin molded article produced by such a specific production method is another aspect of the present invention.

In the present invention, the TFE/PAVE copolymer is molded into the desired shape and then irradiated with radiation at the above-mentioned irradiation temperature, so that the resulting molded article can have excellent crack resistance.

Examples of the TFE/PAVE copolymer include those described above.

The way of molding the TFE/PAVE copolymer is not particularly limited. The TFE/PAVE copolymer may be molded by, for example, a conventionally known method such as extrusion molding, injection molding, transfer molding, inflation method, or compression molding. These molding methods can be appropriately selected depending on the shape of the molded article to be obtained.

Among these, compression molding, injection molding, and extrusion molding are preferred, with injection molding and extrusion molding being more preferred from the viewpoint of easy formation of very small or complex shapes.

Particularly preferred examples of the extrusion molding include wire coating extrusion molding, tube extrusion molding, profile extrusion molding, film extrusion molding, and fiber extrusion molding and the like, are especially the most suitable.

The fluororesin molded article of the present invention is produced through irradiation with radiation after the step of molding of the copolymer mentioned above.

The same way as described above may be employed for irradiating the TFE/PAVE copolymer molded into the desired shape with radiation at an irradiation temperature not higher than the melting point of the TFE/PAVE copolymer but not lower than 200° C.

The fluororesin molded articles of the present invention may further contain other components depending on the needs. Examples of other components include additives, such as cross-linking agents, antistatic agents, heat stabilizer, foaming agents, foam nucleating agents, antioxidants, surfactants, photopolymerization initiators, antiwear agents, and surface modifiers.

The form of the fluororesin molded articles of the present invention is not particularly limited. Examples thereof include films, sheets, plates, rods, blocks, cylinders, containers, wires, and tubes. Among these, sheets and wires are preferred because they are demanding with respect to crack resistance. More preferred are sheets.

The sheets preferably have a thickness of 0.01 to 10 mm.

Examples of applications of the fluororesin molded articles of the present invention include, but not limited to, the following applications:

a diaphragm of diaphragm pumps, bellows molded articles, wire-coated products, semiconductor components, packings and seals, thin wall tubes for rollers in copy machines, monofilaments, gaskets, optical lens parts, tubes for oil drilling, wires for satellites, wires for nuclear power generation, and solar battery panel films.

The fluororesin molded products are especially preferably used in members which require resistance to cracks caused by repeated movement, such as a diaphragm of diaphragm pumps, bellows molded articles, and wire coating materials.

Yet another aspect of the present invention is a method of producing a fluororesin molded article. The method includes molding a TFE/PAVE copolymer; and irradiating the molded copolymer with radiation at an irradiation temperature not higher than the melting point of the copolymer but not lower than 200° C.

The step of molding the TFE/PAVE copolymer may be performed by the above-described method for molding the TFE/PAVE copolymer.

The step of irradiation with radiation may be performed by the above-described method for irradiating TFE/PAVE copolymer with radiation.

As described above, according to the present invention, a modified fluorine-containing copolymer and a fluororesin molded article each having an improved crack resistance can be provided.

EXAMPLES

The present invention is described in more detail below based on, but not limited to, examples.

The amount of the monomer units, the melt flow rate, (MFR), the melting point, and the glass transition temperature were determined by the following methods.
(Amount of Monomer Units)

The amount of each monomer unit was determined by $^{19}$F-NMR.
(MFR)

The MFR was determined in accordance with ASTM D1238. Specifically, the mass (g) of the polymer exiting from a nozzle (inner diameter: 2 mm, length: 8 mm) per 10 minutes was measured using a melt indexer (from Yasuda Seiki seisakusho Ltd.) at 372° C. under a load of 5 kg.
(Glass Transition Temperature)

The glass transition temperature was determined by a dynamic viscoelasticity measurement using DVA-220 (IT Keisoku Seigyo K.K.). The measurement was performed at a temperature-increasing rate of 2° C./min at a frequency of 10 Hz. The temperature at which the tan δ reached the peak was employed as the glass transition temperature.
(Melting Point)

The melting point is a temperature corresponding to a local maximum value on a heat of fusion curve measured at a temperature rise of 10° C./min using a differential scanning calorimeter [DSC].

Example 1

A tetrafluoroethylene (TFE)/perfluoro(propyl vinyl ether) (PAVE) copolymer [TFE/PAVE=94.5/5.5 (% by mass), MFR: 30 g/10 min, melting point: 302° C., glass transition temperature: 93° C.] was processed into a sheet having a thickness of 0.215 mm with a heat-press molding machine. A strip-shaped specimen (width: 12.5 mm, length: 130 mm) was cut out of the sheet.

The specimen was housed in an electron beam irradiation vessel of an electron beam irradiation device (from NHV Corporation). Thereafter, nitrogen gas was injected to place the vessel under a nitrogen atmosphere. The vessel was heated to have an inner temperature of 245° C., and after the temperature was stabilized, the specimen was irradiated with electron beam at an electron beam accelerating voltage of 3000 kV at an intensity of the irradiation dose of 20 kGy/5 min.

The irradiated specimen was subjected to the following MIT repetitive folding test. The result is shown in Table 1.
(MIT Repetitive Folding Test)

The test was performed in accordance with ASTM D2176. Specifically, the obtained specimen (width: 12.7 mm, length: 130 mm) irradiated with electron beam was mounted on a MIT measuring device (model 12176, from Yasuda Seiki seisakusho Ltd.) and was folded under the following conditions: load: 1.25 kg, folding angle: 135 degrees on each of the right and the left sides, and the folding frequency: 175 times/min. The number of folds before the specimen broke (the number of MIT repetition times) was determined.

Examples 2 to 9, Comparative Example 2

Specimens were obtained and subjected to the MIT repetitive folding test in the same manner as in Example 1 except that the electron beam irradiation was performed at the irradiation temperatures and the irradiation doses shown in Table 1. The results are shown in Table 1.

Comparative Example 1

A specimen was obtained and subjected to the MIT repetitive folding test in the same manner as in Example 1 except that the specimen was not irradiated with electron beam. The result is shown in Table 1.

Examples 10 to 14, Comparative Examples 3 and 4

Specimens were obtained in the same manner as in Example 1 except that a tetrafluoroethylene(TFE)/perfluoro (propyl vinyl ether)(PAVE) copolymer [TFE/PAVE=99.9/ 0.1 (% by mass), MFR: 0.1 g/10 min, melting point: 320° C., glass transition temperature: 105° C.] was used as the material.

The specimens were each subjected to the MIT repetitive folding test in the same manner as in Example 1 except that the electron beam irradiation was performed at the irradiation temperature and the irradiation dose shown in Table 2. The results are shown in Table 2.

Examples 15 to 19, Comparative Examples 5 and 6

Specimens were obtained in the same manner as in Example 1 except that a tetrafluoroethylene (TFE)/perfluoro (propyl vinyl ether)(PAVE) copolymer [TFE/PAVE=88/12 (% by mass), MFR: 40 g/10 min, melting point: 260° C., glass transition temperature: 80° C.] was used as the material.

The specimens were each subjected to the MIT repetitive folding test in the same manner as in Example 1 except that the electron beam irradiation was performed at the irradiation temperature and the irradiation dose shown in Table 3. The results are shown in Table 3.

Examples 20 to 24, Comparative Examples 7 and 8

A tetrafluoroethylene (TFE)/perfluoro(propyl vinyl ether) (PAVE) copolymer [TFE/PAVE=94.5/5.5 (% by mass), MFR 12 g/10 min, melting point: 302° C., glass transition temperature: 93° C.] was processed into a sheet having a thickness of 0.215 mm with an injection molding machine. A strip-shaped specimen (width: 12.5 mm, length: 130 mm) was cut out of the sheet.

The specimen was subjected to the MIT repetitive folding test in the same manner as in Example 1 except that the electron beam irradiation was performed at the irradiation temperature and the irradiation dose shown in Table 4. The results are shown in Table 4.

Examples 25 to 29, Comparative Examples 9 and 10

A tetrafluoroethylene (TFE)/perfluoro(propyl vinyl ether) (PAVE) copolymer [TFE/PAVE=94.5/5.5 (% by mass), MFR: 3 g/10 min, melting point: 302° C., glass transition temperature: 93° C.] was processed into a sheet that had a thickness of 0.215 mm with an extrusion molding machine. A strip-shaped specimen (width: 12.5 mm, length: 130 mm) was cut out of the sheet.

The specimen was subjected to the MIT repetitive folding test in the same manner as in Example 1 except that the electron beam irradiation was performed at the irradiation temperature and the irradiation dose shown in Table 5. The results are shown in Table 5.

TABLE 1

|  | Examples | | | | | | | | | Comparative Examples | |
|---|---|---|---|---|---|---|---|---|---|---|---|
|  | 1 | 2 | 3 | 4 | 5 | 6 | 7 | 8 | 9 | 1 | 2 |
| Electron beam irradiation | | | | | | | | | | not irradiated | |
| Irradiation temperature (° C.) | 245 | 260 | 260 | 260 | 275 | 215 | 290 | 245 | 245 | — | 60 |
| Irradiation dose (kGy) | 60 | 20 | 40 | 60 | 40 | 40 | 40 | 150 | 200 | — | 60 |
| MIT repetitive folding test (one thousand times) | 63 | 103 | 376 | 70 | 218 | 57 | 85 | 89 | 61 | 53 | 47 |

TABLE 2

|  | Examples | | | | | Comparative Examples | |
|---|---|---|---|---|---|---|---|
|  | 10 | 11 | 12 | 13 | 14 | 3 | 4 |
| Electron beam irradiation | | | | | | not irradiated | |
| Irradiation temperature (° C.) | 245 | 260 | 260 | 260 | 275 | — | 60 |
| Irradiation dose (kGy) | 60 | 20 | 40 | 60 | 40 | — | 60 |
| MIT repetitive folding test (one thousand times) | 18 | 53 | 107 | 38 | 78 | 17 | 9 |

TABLE 3

|  | Examples | | | | | Comparative Examples | |
|---|---|---|---|---|---|---|---|
|  | 15 | 16 | 17 | 18 | 19 | 5 | 6 |
| Electron beam irradiation | | | | | | not irradiated | |
| Irradiation temperature (° C.) | 245 | 260 | 260 | 260 | 275 | — | 60 |
| Irradiation dose (kGy) | 60 | 20 | 40 | 60 | 40 | — | 60 |
| MIT repetitive folding test (one thousand times) | 12 | 20 | 65 | 25 | 34 | 10 | 3 |

TABLE 4

|  | Examples | | | | | Comparative Examples | |
|---|---|---|---|---|---|---|---|
|  | 20 | 21 | 22 | 23 | 24 | 7 | 8 |
| Electron beam irradiation | | | | | | not irradiated | |
| Irradiation temperature (° C.) | 245 | 260 | 260 | 260 | 275 | — | 60 |
| Irradiation dose (kGy) | 60 | 20 | 40 | 60 | 40 | — | 60 |
| MIT repetitive folding test (one thousand times) | 138 | 264 | 732 | 324 | 240 | 120 | 54 |

TABLE 5

|  | Examples | | | | | Comparative Examples | |
|---|---|---|---|---|---|---|---|
|  | 25 | 26 | 27 | 28 | 29 | 9 | 10 |
| Electron beam irradiation | | | | | | not irradiated | |
| Irradiation temperature (° C.) | 245 | 260 | 260 | 260 | 275 | — | 60 |
| Irradiation dose (kGy) | 60 | 20 | 40 | 60 | 40 | — | 60 |
| MIT repetitive folding test (one thousand times) | 183 | 255 | 1020 | 180 | 600 | 150 | 61.5 |

INDUSTRIAL APPLICABILITY

The molded article produced from the modified fluorine-containing copolymer of the present invention can be used in various applications requiring crack resistance, such as a diaphragm of diaphragm pumps or bellows molded articles.

The invention claimed is:

1. A modified fluorine-containing copolymer consisting only of tetrafluoroethylene units and perfluoro(alkyl vinyl ether) units, the copolymer being modified by irradiation with radiation at an irradiation temperature that is 27° C. or more lower than the melting point of the copolymer but not lower than 230° C. and an irradiation dose of 20 kGy to 200 kGy, wherein the copolymer that consists only of tetrafluoroethylene units and perfluoro(alkyl vinyl ether) units contains the perfluoro(alkyl vinyl ether) units in an amount of 0.1 to 12% by mass based on all the monomer units, wherein the perfluoro(alkyl vinyl ether) is perfluoro(alkyl vinyl ether) represented by Formula (1'):

$$CF_2=CFO-R^f \quad (1')$$

wherein $R^f$ represents a C1 to C5 perfluoroalkyl group.

2. A fluororesin molded article comprising:
the modified fluorine-containing copolymer according to claim 1.

3. A fluororesin molded article obtained by a method of producing a molded article, the method comprising:
molding a copolymer that consists only of tetrafluoroethylene units and perfluoro(alkyl vinyl ether) units; and
irradiating the molded copolymer with radiation at an irradiation temperature that is 27° C. or more lower than the melting point of the copolymer but not lower than 230° C. and an irradiation dose of 20 kGy to 200 kGy,
wherein the copolymer that consists only of tetrafluoroethylene units and perfluoro(alkyl vinyl ether) units contains the perfluoro(alkyl vinyl ether) units in an amount of 0.1 to 12% by mass based on all the monomer units,
wherein the perfluoro(alkyl vinyl ether) is perfluoro(alkyl vinyl ether) represented by Formula (1'):

$$CF_2=CFO-R^f \quad (1')$$

wherein $R^f$ represents a C1 to C5 perfluoroalkyl group, and wherein the fluororesin molded article has a thickness of 0.01 to 10 mm.

4. The fluororesin molded article according to claim 3, wherein the molding is performed by compression molding, injection molding, or extrusion molding.

5. The fluororesin molded article according to claim 2, wherein the fluororesin molded article is a sheet.

6. The fluororesin molded article according to claim 2, wherein the copolymer that consists only of tetrafluoroethylene units and perfluoro(alkyl vinyl ether) units has a melting point of 280° C. to 322° C.

7. The fluororesin molded article according to claim 2, wherein the perfluoro(alkyl vinyl ether) is perfluoro(propyl vinyl ether).

8. A method of producing a fluororesin molded article, the method comprising:
molding a copolymer that consists only of tetrafluoroethylene units and perfluoro(alkyl vinyl ether) units; and
irradiating the molded copolymer with radiation at an irradiation temperature that is 27° C. or more lower than the melting point of the copolymer but not lower than 230° C. and an irradiation dose of 20 kGy to 200 kGy,
wherein the copolymer that consists only of tetrafluoroethylene units and perfluoro(alkyl vinyl ether) units contains the perfluoro(alkyl vinyl ether) units in an amount of 0.1 to 12% by mass based on all the monomer units,
wherein the perfluoro(alkyl vinyl ether) is perfluoro(alkyl vinyl ether) represented by Formula (1'):

$$CF_2=CFO-R^f \quad (1')$$

wherein $R^f$ represents a C1 to C5 perfluoroalkyl group, and wherein the fluororesin molded article has a thickness of 0.01 to 10 mm.

* * * * *